G. H. WHEARY.
REINFORCED TRUNK EDGE CONSTRUCTION.
APPLICATION FILED JUNE 23, 1919.

1,381,149.

Patented June 14, 1921.

Inventor
George Henry Wheary.
By Morsell & Keeney.
Attorneys.

UNITED STATES PATENT OFFICE.

GEORGE HENRY WHEARY, OF RACINE, WISCONSIN.

REINFORCED TRUNK-EDGE CONSTRUCTION.

1,381,149.  Specification of Letters Patent.  Patented June 14, 1921.

Application filed June 23, 1919. Serial No. 306,021.

*To all whom it may concern:*

Be it known that I, GEORGE HENRY WHEARY, a citizen of the United States, and resident of Racine, in the county of Racine and State of Wisconsin, have invented new and useful Improvements in Reinforced Trunk-Edge Construction, of which the following is a description, reference being had to the accompanying drawings, which are a part of this specification.

This invention relates to improvements in reinforced trunk edge construction.

In forming trunks of pieces of lumber nailed or glued together along their adjacent edges the entire strength of the trunk resides in the edge joints. Trunks are subjected to hard usage during transportation and the joints of this type, which are rigid, soon separate and become weakened in use. Furthermore, trunks of this type require heavier lumber to receive the nails and the lumber and edges require a covering of canvas or fiber to cover the parts.

It is one of the objects of the present invention to overcome the before mentioned objectionable features and provide a reinforced trunk edge construction in which the edge portions of the trunk are connected together by metal edge pieces which are riveted to the edge portions of the lumber or other material, the metal edge pieces being so shaped and constructed that a certain amount of flexibility is permitted without straining the parts.

A further object of the invention is to provide a reinforced trunk edge construction in which the metal edge portion is reinforced without increasing the thickness of the metal part through which the rivets extend.

A further object of the invention is to provide a reinforced trunk edge construction in which the use of outside covering or inside lining is eliminated.

A further object of the invention is to provide a reinforced trunk edge construction in which the reinforcing means may be easily inserted and maintained in position in a very simple manner without interfering with the resiliency of the edge construction.

A further object of the invention is to provide a reinforced trunk edge construction which is of simple construction, is strong and durable and is well adapted for the purpose described.

With the above and other objects in view the invention consists of the improved reinforced trunk edge construction and its parts and combinations as set forth in the claims, and all equivalents thereof.

In the accompanying drawings in which the same reference characters indicate the same parts in all of the views.

Figure 1:
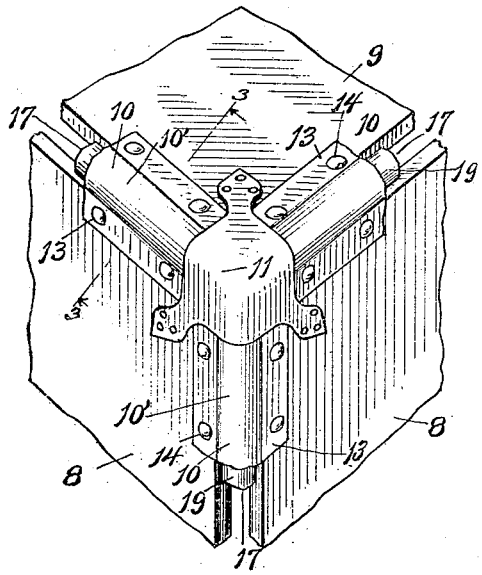
Figure 1 is a perspective view of a corner portion of a trunk provided with the improved reinforced edge construction.

Referring to the drawing the numeral 8 indicates the vertical side portions or panels and 9 the top portion of a trunk. The edges of the side and top portions are spaced apart and connected together by metal edge pieces 10 and corner fixtures 11. The edge portions are preferably formed of sheet steel, as this material will best serve to secure the resiliency or yielding qualities desired. Other metals may also be used if desired.

Figure 2:
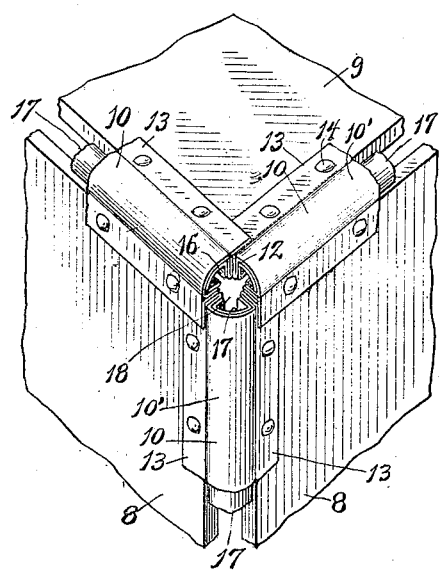
Fig. 2 is a similar view with the corner fixture removed to show interior construction.
Figure 3:
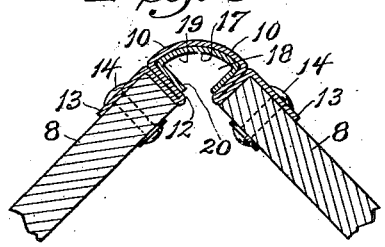
Fig. 3 is a sectional view of an edge portion taken on line 3—3 of Fig. 1.
Figure 4:
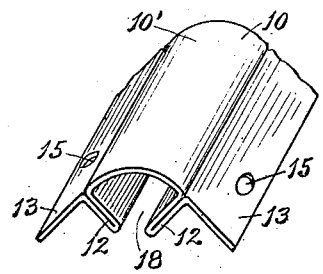
Fig. 4 is a detail perspective view of a portion of one of the metal edge pieces.
Figure 5:
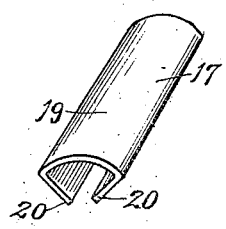
Fig. 5 is a detail perspective view of a portion of one of the reinforcing members.

Each elongated edge piece 10 is constructed from a single piece of material bent to form an intermediate flexible portion 10' of rounded form, or convex on the outer surface. The strip 10 is also bent, by doubling the material upon itself, to form two legs 12, and terminal securing flanges 13. The legs 12 in cross section extend toward each other at right angles and abut against the adjacent edges of the side and top panels 8 and 9 of the trunk, while the terminal securing flanges 13 lie against and are secured to the outer surfaces of the panels by screws or rivets 14, the said flanges being provided with lines of openings 15 for receiving said securing means.

Where the ends of two of the horizontal edge pieces are adjacent the end of the vertically extending edge member, the flanges 13 overlap as clearly shown in Fig. 2 and the corner opening 16 is closed by the corner fixture or member 11 before mentioned.

It has been found in practice that the rounded flexible portion 10' provides the desired resiliency to permit flexing of the panels without separating the parts, but when the trunk is dropped from a truck and the edge strikes a projection there is a possibility of denting said edge and thus tend to mar the general symmetrical appearance of the trunk. To avoid this possibility without interfering with the flexibility of the parts, reinforcing strips 17 are provided which are adapted to be inserted lengthwise in the angular-in-cross section space 18. The reinforcing strips are also preferably constructed of strip steel and each piece is bent to form in cross section an intermediate flexible portion 19 corresponding to the rounded part 10' of the metal edge pieces, and the opposite side edge portions of the reinforcing strip are bent inwardly toward each other at right angles to form legs 20 which bear sidewise against the legs 12 of the said edge pieces 10. As thus constructed and positioned the strips 17 will reinforce the edges of the trunk and prevent unsightly indentations without in any manner interfering with the flexibility of the trunk edges. The corner fixtures 11 cover the corner openings and also prevent the reinforcing strips from working outwardly.

From the foregoing description it will be seen that the reinforced trunk edge construction is of very simple construction and is well adapted for the purpose described.

What I claim as my invention is:

1. The combination with a trunk edge strip of material having a medial portion with inwardly extending spaced apart leg portions and outer terminal securing portions forming an elongated space of angular shape in cross section, of a reinforcing means therefor, consisting of a strip of material extending lengthwise into the space and having in cross section a medial resilient portion and inwardly extending spaced apart leg portions which closely engage corresponding parts of the trunk edge strip.

2. The combination with a trunk edge strip of material having a resilient medial portion with inwardly and approximately right angular extending leg portions and outer terminal securing portions, the inner ends of the legs being spaced apart, said strip in cross section forming an elongated space of angular shape, of a reinforcing means therefor, consisting of a strip of resilient material positioned within the space and having in cross section a medial portion and inwardly extending leg portions which closely engage corresponding parts of the trunk edge strip, the inner edges of the legs of the reinforcing strips being spaced apart.

3. The combination with a trunk edge strip of metal having a resilient outwardly curved medial portion with inwardly extending leg portions of double thickness and outer terminal securing portions, the inner ends of the legs being spaced apart, said strip in cross section forming a space of approximately triangular shape, of a reinforcing means therefor, consisting of a strip of metal positioned within the space and having in cross section a resilient outwardly curved medial portion with inwardly extending leg portions which closely engage corresponding parts of the trunk edge strip, the inner edges of the legs of the reinforcing strip being spaced apart.

In testimony whereof, I affix my signature.

GEORGE HENRY WHEARY.